United States Patent Office 3,445,435
Patented May 20, 1969

3,445,435
POLYMERISATION OF CONJUGATE DIENES
Adrien Azoulay, Pau, and Jean Teitgen, Arthez-de-Bearn, France, assignors to Societe Nationale des Petroles d'Aquitaine, Paris, France
No Drawing. Filed Feb. 18, 1966, Ser. No. 528,360
Claims priority, application France, Feb. 24, 1965, 6,754
Int. Cl. C08d 1/24, 3/06, 3/08
U.S. Cl. 260—94.3                                          7 Claims

ABSTRACT OF THE DISCLOSURE

This invention relates to the polymerization of conjugate dienes and, more particularly, to a process for the emulsion polymerization of butadiene and polymeric substances obtained thereby having a low 1,2-vinyl structure content, having a low 1,4-trans structure content, while the proportion of 1,4-cis structure is relatively high.

---

The polymerisation of butadiene leads to the addition of monomers both in the 1,2-position and in the 1,4-cis- and 1,4-trans-positions owing to the two conjugate double bonds. Therefore, the polymeric substance resulting therefrom has a microstructure comprising these three forms. It appears to be established that the 1,2-vinyl structure has a disadvantageous influence on the elastic and mechanical properties of the vulcanisate obtained from polybutadiene, which is important especially in the manufacture of pneumatic tyres. Consequently, it is desirable to reduce the polymer content in the 1,2-vinyl form. Now, emulsion polymerisation by known methods always leads to more or less high contents of 1,2-vinyl structure, which can scarcely be lower than 20%.

It is also known that emulsion polymerisation under the usual conditions leads to a high proportion of 1,4-trans structure, generally above 70%, while the 1,4-cis content is very low, generally below 10%. This fact is not favourable to the technological properties of the elastomer, and it would be desirable to increase the content in cis form and decrease that of the trans form.

The present invention provides the desired improvement. It is possible thereby very considerably to lower the 1,2-vinyl structure in the polymeric substance obtained from a conjugate diene, while it also makes it possible to increase very considerably the proportion of the 1,4-cis stucture at the expense of the 1,4-trans structure, the content of which is lowered. Thus, in accordance with the present invention, there are obtained polybutadienes containing less than 20% of 1,2-vinyl structure—generally less than 17%—while the 1,4-trans content is below 70%, that of the 1,4-cis structure ranging up to more than 20%.

The improvement according to the present invention consists primarily in carrying out the emulsion polymerisation with the gradual introduction of the initiator in the course of the polymerisation. In accordance with a preferred aspect, this introduction of the initiator takes place continuously and with a supply decreasing as a function of time. In other words, the proportion of initiator introduced at the beginning of the polymerisation only constitutes a fraction of the total necessary quantity of catalyst, but it is greater than the quantities thereafter added. In short, the quantity of initiator introduced into the emulsion at each instant is lower than the quantity added at a preceding instant.

The part played by this factor is rather surprising, because it has hitherto been accepted that, with a given system, the microstructure and the molecular distribution of the polymer were scarcely affected by the proportion of catalyst and consequently by the speed of polymerisation. The present invention arises out of the unexpected observation that the distribution of the 1,2-vinyl, 1,4-trans and 1,4-cis structures is greatly influenced by the mode and speed of introduction of the catalysts, and not only by the temperature of the medium. While in accordance with the earlier knowledge it was necessary to lower the temperature of the medium from 100 C. to —20° Ci in order to be able to reduce the 1,2-vinyl structure content from 25% to 19%, it is possible by the process of the invention to lower this content to the neighbourhood of 15% at reasonable and practical temperatures, notably from 0° to 10° C.

The introduction of the initiator as a function of time in accordance with the process of the invention is preferably so adjusted that, during the first hour of the polymerisation, from 20% to 30% of the required total quantity of initiator is introduced, preferably continuously, and the rate of supply is gradually lowered, so as finally to represent only 1% to 2% during the last hour of the operation. As a first approximation, the curve of these variations in the rate of supply follows an approximate exponential law whose ordinates are the times and whose abscissae are the quantities of initiator introduced.

Thus, by way of example, the quantities of initiator introduced during each hour of the polymerisation in the case of an operation lasting 12 hours are in the following ratios:

14.4:11.2:8.9:7.0:5.6:4.5:3.5:2.7:2:1.5:1.2:0.9

The total quantity thus being equal to 63.4, it will be seen that during the first hour there have been introduced 14.4, i.e. 22.7% of 63.4, while during the last hour, there has been introduced only 0.9, i.e. 1.4% of the total.

In the case of a 10-hour polymerisation, for example, the introduction curve is defined by the following ratios:

14.4:10.6:8:6:4.6:3.4:2.5:1.8:1.2:0.9

There have here been introduced during the first hour 27% of the total, which amounts to 53.4, while only 1.68% of the total quantity is added during the last hour.

Of course, the invention is not limited to the numerical particulars indicated merely by way of example, which may obviously be modified in accordance with the nature of the catalysts, the temperature and where necessary other factors of the polymerisation.

Although the improvement according to the invention may be applied to polymerisation carried out at various temperatures, with different catalysts, modifiers, emulsifiers, etc., its industrial value is particularly great when operating at temperatures of the order of —2° to 20° C. and above all between 0° and 10° C., particularly in the neighborhood of +5° C.

In order to illustrate the invention, there are given in the following a number of non-limiting examples of application to the conventional polymerisation of butadiene.

Examples 1 to 6

In a reactor on which there is mounted a graduated funnel for the continuous introduction of the initiator, the emulsion polymerisation of butadiene is carried out under the following conditions:

Proportions calculated on the butadiene:

| | |
|---|---|
| K resinates (emulsifiers) _____percent__ | 4.56 |
| Reducing agent $FeSO_4 \cdot 7H_2O$ _____do____ | 0.012 |
| Initiator (paramenthane hydroperoxide) __do____ | 0.072 |
| Temperature _____° C__ | +5 |
| pH _____ | 10 |

The modifier employed is terdodecylmercaptan. The polymerisation is carried out with appropriate stirring in known manner.

In Examples 1, 2 and 3 the initiator and the reducing agent are introduced at the outset, before the commencement of the polymerisation.

On the other hand, in Examples 4, 5 and 6, the reducing agent and the initiator are added gradually to the emulsion, in accordance with the approximately parabolic progress, indicated in the foregoing. The following results are then obtained:

|  | Catalysts completely introduced at the beginning | | | Catalysts gradually introduced | | |
|---|---|---|---|---|---|---|
|  | 1 | 2 | 3 | 4 | 5 | 6 |
| Percent of modifier | 0.1 | 0.35 | 0.5 | 0.2 | 0.4 | 0.2 |
| Duration (in hours) | 10.25 | 12.25 | 9.10 | 14 | 9.30 | 7.05 |
| Extent of conversion, percent | 55 | 62 | 55 | 62.8 | 64.6 | 63.5 |
| Extent of conversion, percent per hour | 5.3 | 5 | 6.5 | 4.5 | 6.8 | 9 |
| Percent of gel | <5 | <5 | <5 | 5 | 1 | 2 |
| Molecular weight ×10$^{-3}$ | 525 | 295 | 175 | 445 | 180 | 385 |
| 1,4-trans content (percent) | 80 | 78 | 74 | 62 | 60 | 62 |
| 1,4-cis content (percent) | 0 | 1 | 6 | 22 | 24.5 | 21.5 |
| 1,2-vinyl content (percent) | 20 | 21 | 20 | 16 | 15.5 | 16.5 |

It will be seen that the introduction of the catalyst, i.e. of the initiator and of the reducing agent, into this reaction medium with gradually decreasing rates of supply, brings about a somewhat fundamental modification of the microstructure of the polymer obtained, while yielding high molecular weights. While Examples 1, 2 and 3, which were carried out in conventional manner, give 74–80% of 1,4-trans product, 0–6% of 1,4-cis product and 20–21% of 1,2-vinyl product, these proportions become 60–62%, 21.5–24.5% and 15.5–16.5% respectively.

We claim:

1. A process for the emulsion polymerization of conjugate dienes, comprising the addition to the emulsion of an organic peroxide catalyst jointly with a reducing agent during the polymerization, the improvement which consists in controlling said addition in such a way that the rates at which the organic peroxide and of the reducing agent are introduced into the emulsion always decrease from the beginning to the end of the polymerization, whereby the proportion of 1,4-trans and 1,2-vinyl structures of the polymer produced are lowered, while the amount of 1,4-cis structure is substantially increased.

2. A process as recited in claim 1, wherein the introduction of the catalyst and the reducing agent is continuous.

3. A process as recited in claim 1, wherein from 20% to 30% of the total necessary quantity of the catalyst and the reducing agent are introduced during the first hour of polymerization.

4. A process as recited in claim 1, wherein the last 1% to 2% of the total quantity of the catalyst and the reducing agent is introduced during the last hour of polymerization.

5. A process as recited in claim 1, wherein the rate of supply of the catalyst and the reducing agent, introduced into the emulsion, as a function of time, is approximately an exponential function.

6. A process as recited in claim 1, wherein the polymerization takes place at a temperature in the range from $-2°$ C. and $+20°$ C.

7. A process for the emulsion polymerization of butadiene at 0° to 10° C., comprising the addition to the emulsion of an organic peroxide catalyst, of ferrous sulfate as reducing agent, and of terdodecylmercaptan as modifier, the improvement which consists in introducing the peroxide and the ferrous sulfate into the emulsion during the polymerization in such a way that the rates of peroxide and sulfate introduced exponentially decrease from the beginning to the end of the polymerization, whereby the proportion of 1,2-vinyl structure of the polybutadiene produced is lowered to less than 17%, while the proportion of 1,4-cis structure of the polybutadiene is increased to more than 20%.

References Cited

UNITED STATES PATENTS

| 3,049,519 | 8/1962 | Reynolds | 260—84.1 |
| 3,007,903 | 11/1961 | Stark | 260—87.7 |
| 3,317,918 | 5/1967 | Foster | 260—83.7 |

FOREIGN PATENTS 671,683   10/1963   Canada.

JOSEPH L. SCHOFER, *Primary Examiner.*

R. A. GAITHER, *Assistant Examiner.*

U.S. Cl. X.R.

260—94.4